United States Patent
Nishimura et al.

(10) Patent No.: US 6,837,524 B2
(45) Date of Patent: Jan. 4, 2005

(54) HOSE CLAMPING STRUCTURE

(75) Inventors: Motohide Nishimura, Kani (JP); Chiaki Yuzuriha, Kasugai (JP)

(73) Assignee: Tokai Rubber Industries, Ltd., Komaki (JP)

(*) Notice: Subject to any disclaimer, the term of this patent is extended or adjusted under 35 U.S.C. 154(b) by 17 days.

(21) Appl. No.: 10/400,662

(22) Filed: Mar. 28, 2003

(65) Prior Publication Data

US 2003/0184087 A1 Oct. 2, 2003

(30) Foreign Application Priority Data

Mar. 29, 2002 (JP) ........................................ 2002-095269

(51) Int. Cl.[7] .............................................. F16L 33/00
(52) U.S. Cl. ...................................... 285/256; 285/259
(58) Field of Search ................................ 285/256, 241, 285/259

(56) References Cited

U.S. PATENT DOCUMENTS

| | | | | | |
|---|---|---|---|---|---|
| 3,690,703 | A | * | 9/1972 | Philipps ...................... | 285/256 |
| 4,226,446 | A | * | 10/1980 | Burrington .................. | 285/256 |
| 5,040,829 | A | * | 8/1991 | Sauer ......................... | 285/256 |
| 5,044,671 | A | * | 9/1991 | Chisnell et al. ............. | 285/256 |
| 5,080,404 | A | * | 1/1992 | Sauer ......................... | 285/256 |
| 5,358,012 | A | * | 10/1994 | Kish ........................... | 285/256 |
| 5,387,016 | A | * | 2/1995 | Joseph et al. ............... | 285/256 |
| 5,417,461 | A | * | 5/1995 | Dougherty et al. .......... | 285/256 |
| 5,622,394 | A | * | 4/1997 | Soles et al. .................. | 285/256 |
| 5,797,629 | A | * | 8/1998 | Beagle ........................ | 285/256 |
| 5,961,157 | A | * | 10/1999 | Baron et al. ................. | 285/256 |
| 6,186,559 | B1 | * | 2/2001 | Fisher et al. ................. | 285/256 |

FOREIGN PATENT DOCUMENTS

JP          09-229271          9/1997

* cited by examiner

*Primary Examiner*—David Bochna
(74) *Attorney, Agent, or Firm*—Oblon, Spivak, McClelland, Maier & Neustadt, P.C.

(57) ABSTRACT

A hose clamping structure 10 includes: a metal pipe 11 having an inserting end portion 12 straightly extending in an axial direction at one end and having a ring-shaped projecting portion 13 at a leading end of the inserting end portion 12; a rubber hose 16 insertedly fitted to the entire outer surface of the inserting end portion by press-fitting and secured thereto in an unbonded manner; and a tubular sleeve member 21 mounted to the outer surface of the rubber hose and extending over the substantially full length of the inserting end portion, and tightened from outside so as to clamp the rubber hose. The sleeve member includes a second tightening portion 27 and a first tightening portion 24 apart from each other in an axial direction. The first tightening portion includes a tubular portion 25 substantially parallel with the axial direction at the side of the second tightening portion, and a tapered portion 26 tapered and widened into a conical shape from the tubular portion toward the leading end of the inserting end portion.

2 Claims, 1 Drawing Sheet

HOSE CLAMPING STRUCTURE

BACKGROUND OF THE INVENTION

The present invention relates to a hose clamping structure in which a hose insertedly fitted to the outer surface of an inserting end portion of a metal pipe is clamped and secured to the metal pipe by tightening a sleeve member which is provided to cover the outer surface of the hose.

Conventionally, hose clamping structures of this type are classified into those for fuel hose having relatively low pressure-resistance (10 kgf/cm$^2$) and those for power steering hose or freon hose having high pressure-resistance (100 kgf/cm$^2$). In one exemplary hose clamping structure for a fuel hose, an adhesive agent is applied over the outer surface of a metal pipe; the resultant metal pipe and a rubber hose are adhered to each other; and a sleeve member mounted to the outer surface of the hose is tightened to a rubber hose in a flat tightening operation where the tightening section is tightened over a wide area substantially parallel to the axial direction. In another exemplary hose clamping structure for a fuel hose, an elastic member is interposed between a metal pipe and a rubber hose; for example, an elastic coating agent such as a rubber paste and the like is applied to the metal pipe; and a sleeve member is tightened onto a rubber hose at two portions in an axial direction in a two-stage tightening operation. In the case of a hose clamping structure for a power steering hose, ring-shaped grooves are formed in advance by a rolling process and the like at three portions of an inserting end portion of a metal pipe in an axial direction; a rubber hose is insertedly fitted to the metal pipe; a sleeve member is provided to cover the hose; and the sleeve member is tightened onto the rubber hose in a three-stage tightening operation at positions corresponding to the ring-shaped grooves of the metal pipe. As a result of employing the three-stage tightening operation, the clamping structure becomes too long for a fuel hose having low pressure-resistance, and layout of such clamping structure is difficult.

By the way, in the case where a clamping structure is used for connecting an automatic transmission with a radiator as is the case of the clamping structure for connecting an oil hose with a metal pipe in an automobile, oil having high temperature and high pressure flows through the clamping structure. For this reason, the hose clamping structure is required to have pressure-resistance of 25 kgf/cm$^2$ or higher at high temperature, which is higher than the pressure-resistance of the hose clamping structure for the fuel hose. Further, in such a hose clamping structure, it is required that a portion tightened with a sleeve member has a length as small as possible due to the relationship with a location where the hose clamping structure is provided, and in addition, is required to be low in price. Considerations have been made as to what design of hose clamping structure is suitable for such an application. For example, in the above case of the hose clamping structure for a fuel hose, it is necessary to use an adhesive agent or a coating agent. This results in increasing the price of the connection structure. In addition, flat tightening operation cannot attain sufficient pressure-resistance and there is a possibility that a rubber hose may come off.

Contrary to the above, as shown in FIG. 3, it is possible to tighten the sleeve member in a two-stage tightening operation instead of flat tightening operation, without using an adhesive agent. The two-stage tightening operation is conducted by pressing a sleeve member 1 from eight directions on the circumference toward an axial center by use of a tightening dice 4 normally divided into eight segments in its circumferential direction and having projections 4a at opposite ends radially inwardly projected into a rectangular shape in cross section. However, in this hose clamping structure, a rubber hose 3 is clamped only at two ring-shaped tightening sections 2 of the sleeve member 1 in an axial direction. In this structure, the tightening force of the sleeve member 1 is not sufficient, and the hose clamping structure does not exhibit sufficient pressure-resistance at high temperature.

Further, in the hose clamping structure for a power steering hose, a rubber hose is insertedly fitted to a metal pipe, and a sleeve member is provided to cover the rubber hose. Then, the sleeve member is tightened in a three-stage tightening operation at positions corresponding to the ring-shaped grooves of the metal pipe. In this structure, it is possible to attain sufficiently high tightening strength without using an adhesive agent. If, however, a hose is long and has a curved portion, a large-sized pipe rolling apparatus is used. In this case, the production cost is increased, thereby increasing the price of the hose clamping structure. Further, since this hose clamping structure needs a three-stage tightening operation, the tightening portion becomes long. Accordingly, the hose clamping structure also becomes long, and there is a possibility that the layout thereof is limited when it is arranged.

SUMMARY OF THE INVENTION

The present invention has been made to solve the above-described problem, and an objective thereof is to provide a hose clamping structure simple in design and low in price, capable of exhibiting pressure-resistance high enough to withstand a passage of fluid with high temperature and high pressure even if no adhesive agent is used and the portion tightened with the sleeve member is short in length.

In order to achieve the above-described objective, the present invention provides a hose clamping structure including: a metal pipe having an inserting end portion straightly extending in an axial direction at one end and having a ring-shaped projecting portion at a leading end of the inserting end portion; a rubber hose insertedly fitted to the entire outer surface of the inserting end portion of the metal pipe by press-fitting and secured thereto in an unbonded manner; and a metallic tubular sleeve member mounted to the outer surface of the rubber hose and extending over the substantially full length of the inserting end portion, and tightened from outside toward an axial center direction along a circumferential direction so as to clamp the rubber hose to the metal pipe. The sleeve member is tightened in a two-stage tightening operation where the sleeve member is tightened at two portions apart from each other in an axial direction, and a first tightening portion at the leading end side of the inserting end portion is longer in length than a second tightening portion inwardly located in an axial direction, and the first tightening portion extends to reach the leading end of the inserting end portion.

In the present invention, the sleeve member mounted to the outer surface of the rubber hose insertedly fitted to the metal pipe and extending over the entire length of the inserting end portion of the metal pipe is tightened in a two-stage tightening operation where the sleeve member is tightened at two portions apart from each other in an axial direction. The first tightening portion at the leading end side of the inserting end portion has an axial length larger than the second tightening portion inwardly located in an axial direction. At the same time, the first tightening portion extends to reach the leading end of the inserting end portion. With this arrangement, the tightening force of the first tightening portion is exerted to the leading end side of the rubber hose, and the tightening force for clamping the rubber hose to the metal pipe is increased as compared with a conventional two-stage tightening operation. As a result, high pressure-resistance can be assured in a hose clamping structure through which a fluid with high temperature and high pressure is passed. That is, it is possible to prevent the hose from coming off caused by an inner pressure at high temperature (at about 150° C.) which is assumed in an actual use. In addition, since the sleeve member is tightened in a two-stage tightening operation, the length of the portion to be tightened with the sleeve member can be reduced and the space occupied by the hose clamping structure can be reduced accordingly. Further, it is enough to merely form a ring-shaped projecting portion at the leading end of the metal pipe, and such a ring-shaped projecting portion can be formed by bulging process which is simpler as compared with rolling process and is low in cost. In addition, since an adhesive agent is not necessary, costs for an adhesive agent and its coating process are unnecessary. As a result, the cost for the hose connecting structure of the present invention is reduced.

In addition, the first tightening portion may be formed by an integral unit including a tubular portion substantially parallel to an axial direction at an inner end side in an axial direction, and a tapered portion tapered and widened into a conical shape from the tubular portion toward the leading end. Since the first tightening portion includes the tubular portion substantially parallel with the axial direction at an inner end side in an axial direction, and the tapered portion tapered and widened into a conical shape from the tubular portion toward the leading end, there is no fear that the tapered portion crushes the ring-shaped projecting portion formed at the leading end of the metal pipe, and the ring-shaped projecting portion can be properly tightened. Accordingly, the tightening force at the first tightening portion is increased, and as a result, the tightening force of the entire sleeve member for clamping the rubber hose is increased.

Further, the tightening rate of the tapered portion when it compresses the rubber hose between the tapered portion and the ring-shaped projecting portion can be set to 30 to 40 percent. Here, the tightening rate of the sleeve member is a difference in thicknesses before and after the rubber hose is tightened, that is, a rate obtained by dividing the thickness of the rubber hose after the tightening operation by a thickness of a rubber hose before the tightening operation. Since the tightening rate of the tapered portion of the first tightening portion when it compresses the rubber hose against the ring-shaped projecting portion is set to 30 to 40 percent, the tapered portion exhibits proper tightening effect, and the tightening force of the entire sleeve member is increased in conjunction with the tubular portion and the second tightening portion. As a result, high pressure-resistance required in a hose clamping structure through which a fluid with high temperature and high pressure is passed can be sufficiently attained.

DETAILED DESCRIPTION OF THE PREFERRED EMBODIMENTS OF THE INVENTION

Figure 1:
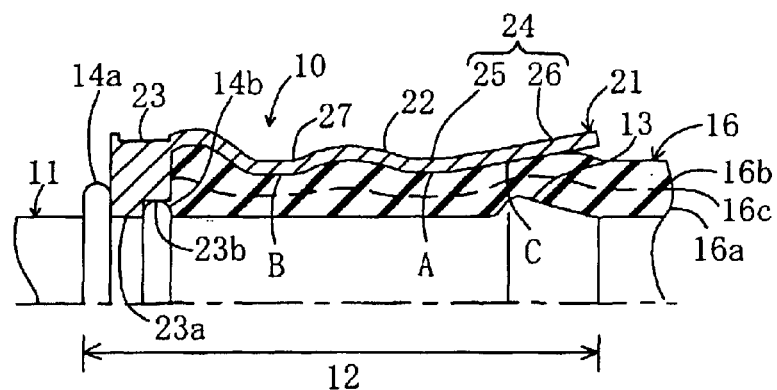
FIG. 1 is a cross-sectional view schematically showing an upper half of a hose clamping structure according to an embodiment of the present invention.

Hereinafter, an embodiment of the present invention will be described by way of drawings. FIG. 1 is a cross-sectional view schematically showing an upper half of a hose clamping structure 10 according to this embodiment, for use in connecting a metal pipe with an oil hose which connects an automatic transmission with a radiator in an automobile. The hose clamping structure 10 includes; a metal pipe 11 which is formed with an inserting end portion 12 extending straightly in an axial direction at one end, a ring-shaped projecting portion 13 formed at the leading end of the inserting end portion 12, and positioning projections 14a, 14b at an inner end in an axial direction: a rubber hose 16 which is insertedly fitted over the entire outer surface of the inserting end portion 12 by press-fitting and is secured thereto in an unbonded manner; and a tubular sleeve member 21 which is mounted to an outer surface of the rubber hose 16 so as to extend substantially over the entire length of the inserting end portion 12 and is tightened into a ring shape from the outer surface toward an axial center direction and along the circumferential direction so as to clamp and secure the rubber hose 16 to the metal pipe 11.

The metal pipe 11 is made of a thin steel pipe and the like. The leading end of the straight-shaped inserting end portion 12 formed at one end of the metal pipe 11 is a ring-shaped projecting portion 13 which projects into a ring shape. In addition, a pair of inward and outward ring-shaped positioning projections 14a, 14b are located at inner end positions of the inserting end portions 12 in an axial direction so as to be slightly apart from each other in an axial direction. The positioning projection 14a located at inner side in the axial direction has an outer diameter slightly larger than that of the positioning projection 14b located at an outer side in the axial direction. The ring-shaped projecting portion 13 and the positioning projections 14a, 14b are produced by a simple beading process at cost lower than the case of employing a rolling process.

The rubber hose 16 is a high pressure-resistive hose, and has an inner layer 16a, an outer layer 16b, and a reinforcing layer 16c provided at an boundary therebetween and made of knitting yarn of vinylon or polyester. The inner layer 16a is made of oil resistive rubber. The outer layer 16b is made of weather resistive rubber. A sleeve member 21 is mounted to an outer surface of the rubber hose 16 at its portion to be insertedly fitted to the metal pipe 11.

The sleeve member 21 includes: a tube portion 22 having the substantially same length as of the inserting end portion 12 of the metal pipe 11 made of thin steel pipe; and a brim-shaped engaging end portion 23 projecting from the inner end of the tube portion 22 in the axial center direction. The tube portion 22 is formed with a second tightening portion 27 and a first tightening portion 24 separated from each other at two positions in an axial direction, that is, at the side of the engaging end portion 23 and at the opposite side thereto. The second tightening portion 27 is formed into a ring shape slightly extending in parallel to an axial direction. The first tightening portion 24 is constituted by: a tubular portion 25 having the substantially same length as of the second tightening portion 27 which is located at the side of the second tightening portion 27 and is parallel to an axial direction; and a tapered portion 26 which is continuous from the tubular portion 25 and is tapered and widened into a conical shape toward the leading end.

The inner surface of the engaging end portion 23 has a step, and includes: an engaging projecting portion 23a at the inner end side having an inner diameter slightly larger than the outer diameter of the metal pipe 11; and an inner portion 23b having an inner diameter slightly larger than the outer diameter of the positioning projection 14b and continuous from the engaging projecting portion 23a. When the sleeve member 21 is inserted into the metal pipe 11, the engaging projecting portion 23a is brought into contact with the positioning projection 14a. By being tightened in this state, the engaging end portion 23 is insertedly fitted and secured between the positioning projections 14a, 14b. If necessary, the sleeve member may be made of a metal pipe other than a steel pipe.

Next, a production of the above-mentioned hose clamping structure will be described.

Figure 2:
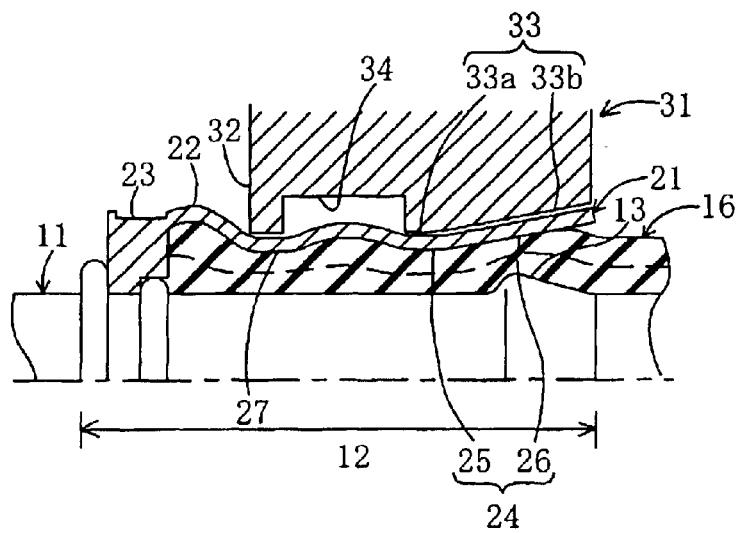
FIG. 2 is a cross-sectional view of an upper half of the hose clamping structure of FIG. 1 for schematically illustrating the steps of tightening a sleeve member of the hose clamping structure.
Figure 3:
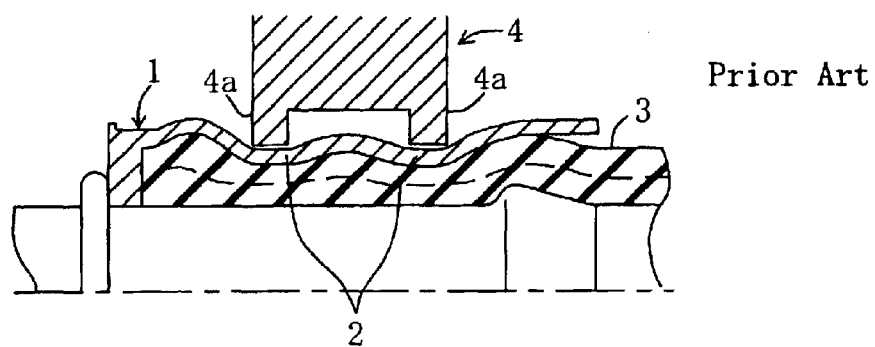
FIG. 3 is a cross-sectional view of an upper half of a conventional hose clamping structure for schematically illustrating the steps of tightening a sleeve member of the hose clamping structure in a two-step tightening operation.

First, the sleeve member 21 in a straight tubular shape before being tightened is fitted to the outer surface of the inserting end portion 12 of the metal pipe 11 until the sleeve member 21 is brought into contact with the positioning projection 14a of the metal pipe 11, and the leading end is tightened with a tightening dice (not shown) and the like. Next, the leading end portion of the rubber hose 16 is insertedly fitted to the metal pipe 11 until it is brought into contact with the positioning projection 14b of the metal pipe 11. Next, as shown in FIG. 2, the sleeve member 21 is tightened in a two-stage tightening operation where it is tightened by a tightening dice 31 from eight directions at its outer surface.

The tightening dice 31 includes: a second projecting portion 32 at one end in an axial direction, that is, at the side of the positioning projections 14a, 14b of the metal pipe 11 and having a narrow width; a first projecting portion 33 at the other end in an axial direction, that is, at the side of the ring-shaped projecting portion 13, and having a wide width; and a groove 34 provided between the second projecting portion 32 and the first projecting portion 33 so as to separate them from each other and having a width larger than the second projecting portion 32. The second projecting portion 32 has an inner surface parallel to an axial direction. The first projecting portion 33 includes: a tubular portion 33a having the same width as of the second projecting portion 32 at the side of the groove 34 and being parallel with an axial direction; and a tapered portion 33b continuous from the tubular portion 33a and widened into a conical shape and slightly tapered toward the leading end. The length in an axial direction of the tapered portion 33b is larger than that of the groove 34.

By being tightened at two stages from eight directions using the tightening dice 31, the sleeve member 21 is pressed from its outer surface toward an axial center direction, so that the first tightening portion 24 and the second tightening portion 27 are formed. As a result, the sleeve member 21 strongly clamps the rubber hose 16 to the metal pipe 11. In this embodiment, the sleeve member 21 is pressed from eight directions on the circumference toward an axial center. Alternatively, it may be tightened in six directions and the like in accordance with necessity such as an outer diameter of the sleeve member and the like. In this embodiment, when the sleeve 21 is tightened, the first tightening portion 24 has an axial length longer than that of the second tightening portion 27 inwardly located in an axial direction, and the sleeve member 21 is tightened adequately without crushing the ring-shaped projection portion 13 at the leading end of the metal pipe 11 by the tapered portion 26 of the first tightening portion 24. Due to this arrangement, the tapered portion 26 assures proper tightening in conjunction with the tubular portion 25 of the first tightening portion 24, thereby enhancing the tightening force of the sleeve member 21 as a whole.

The tightening rate of the tapered portion 26 when it compresses the rubber hose 16 against the ring-shaped projecting portion 13 (a portion C shown in FIG. 1) is in a range between 30 to 40 percent. At this tightening rate, the tapered portion 26 exhibits proper clamping effect. The tightening rate of the tubular portion 25 and the second tightening portion 27 (portions A, B shown in FIG. 1) is in a range between 30 to 40 percent. As a result, in this embodiment, the tightening force of the sleeve member 21 is improved as compared with conventional cases. Therefore, it is possible to ensure high pressure-resistance of 25 kgf/cm$^2$ or higher in the hose clamping structure 10 against a passage of a fluid having high temperature and high pressure, that is, it is possible to prevent the hose from coming off by an inner pressure at high temperature.

In addition, the ring-shaped engaging end portion 23 of the sleeve member 21 is insertedly fitted and secured between a pair of positioning projections 14a, 14b located at an inner end in an axial direction of the inserting end portion 12 of the metal pipe 11. Due to this arrangement, the sleeve member 21 is positioned to the metal pipe 11 at the time of insertion, and it is possible to ensure the prevention of the sleeve member 21 and the rubber hose 16 from coming off the metal pipe 11.

As described above, in this embodiment, since the sleeve member 21 is tightened in two-stage tightening operation, the tightening force of the first tightening portion 24 is enhanced. Therefore, the high pressure-resistance of the hose clamping structure 10 against a passage of a fluid having high temperature and high pressure is ensured. Further, since the sleeve member 21 is tightened in two-stage tightening operation, it is possible to decrease the length in an axial direction of the sleeve member 21. As a result, the space occupied by the hose clamping structure 10 can be reduced. Further, the ring-shaped projecting portion 13 and the positioning projections 14a, 14b of the metal pipe 11 can be produced in a simple bulging process. Therefore, it is possible to provide the metal pipe 11 at low cost. In addition, since there is no need of an adhesive agent, costs for an adhesive agent and its coating process are not necessary. Thereby, the cost of the hose clamping structure 10 can be further reduced.

In the above-described embodiment, two positioning projections 14a, 14b are formed in the metal pipe 11. Alternatively, only either one of them is possible. In addition, the engaging end portion 23 of the sleeve member 21 may be omitted if necessary. The hose clamping structure in the above-embodiment has been shown only as an example, and various modifications may be made without departing from the principle of the present invention.

What is claimed is:
1. A hose clamping structure comprising:
 a metal pipe having an inserting end portion straightly extending in an axial direction at one end and having a ring-shaped projecting portion at a leading end of the inserting end portion;

a rubber hose insertedly fitted to an entire outer surface of the inserting end portion of said metal pipe by press-fitting and secured thereto in an unbonded manner; and a metallic tubular sleeve member mounted to an outer surface of said rubber hose and extending over a substantially full length of said inserting end portion, and tightened from outside toward an axial center direction along a circumferential direction to clamp said rubber hose to said metal pipe, wherein said sleeve member is tightened in a two-stage tightening operation where the sleeve member is tightened at two portions apart from each other in an axial direction, and a first tightening portion at the leading end side of said inserting end portion is longer in length than a second tightening portion inwardly located in an axial direction, and said first tightening portion extends to reach the leading end of said inserting end portion, said first tightening portion is formed by an integral unit including a tubular portion substantially parallel to an axial direction at an inner end side in an axial direction, and a tapered portion tapered and widened into a conical share from said tubular portion toward the leading end of said inserting end portion, and a portion of said rubber hose provided between said first tightening portion and said ring-shaped projecting portion of said metal pipe is compressed only by the tapered portion.

2. A hose clamping structure according to claim 1, wherein a tightening rate of said tapered portion when it compresses said rubber hose between said tapered portion and said ring-shaped projecting portion is 30 to 40 percent, the tightening rate being obtained by dividing a contracting thickness of the rubber hose after a tightening operation by a thickness of that rubber hose before the tightening operation.

* * * * *